United States Patent [19]

Yokoyama

[11] 4,144,751

[45] Mar. 20, 1979

[54] SQUARE WAVE SIGNAL GENERATOR

[75] Inventor: Akira Yokoyama, Tokyo, Japan

[73] Assignee: Honeywell Inc., Minneapolis, Minn.

[21] Appl. No.: 830,989

[22] Filed: Sep. 6, 1977

[51] Int. Cl.² .............................................. G01F 1/60
[52] U.S. Cl. .............................. 73/194 EM; 361/154
[58] Field of Search ................. 73/194 EM; 361/154, 361/155

[56] References Cited

U.S. PATENT DOCUMENTS

| 3,396,314 | 8/1968 | Corson et al. | 361/154 |
| 3,550,446 | 12/1970 | Tucker et al. | 73/194 EM |
| 3,634,733 | 1/1972 | Boyer | 361/154 |
| 3,852,646 | 12/1974 | Mason | 361/154 |
| 3,955,413 | 5/1976 | Steele et al. | 73/194 EM |

Primary Examiner—Charles A. Ruehl
Attorney, Agent, or Firm—Laurence J. Marhoefer; Lockwood D. Burton; Mitchell J. Halista

[57] ABSTRACT

A square-wave signal generator circuit for generating a rectangular waveform signal particularly for application to the field coil of an electromagnetic flow meter. A coil excitation current from a direct current source is switched to provide a current flow in alternate directions through the field coil. During the transient time of the coil excitation current following the switching operation, a higher output voltage from the source is used to shorten the current rise and fall times while a lower voltage from the source is used during a steady state time of the excitation current to minimize power losses. A switching circuit using a switching transistor is used to select the higher voltage while a back-biased diode is used to immediately introduce the lower voltage when the excitation current has reached a steady state. A voltage comparator is used to compare the voltage generated by the excitation current with a reference voltage to produce an output signal for operating the switching transistor between its on and off states during the transient and steady state current conditions, respectively.

7 Claims, 4 Drawing Figures

SQUARE WAVE SIGNAL GENERATOR

BACKGROUND OF THE INVENTION

1. Field of the Invention

The present invention relates to signal generators. More specifically, the present invention is directed to a square wave generator circuit suitable for use in energizing a field coil in an electromagnetic flow meter.

2. Description of the Prior Art

The excitation of the field coil in an electromagnetic flow meter has necessitated the production of a squarewave current signal which because of the inductance of the field coil has been distorted from a true rectangular configuration. Thus, abrupt rise and fall times of the current signal are modified during a transient period into a lengthy slowly changing waveshape. In order to shorten this transient period, the output direct current voltage supply for the rectangular waveform generating can be increased. However, such an increase in the direct current voltage involves an increase in the cost of the circuit and the added hazard of a high voltage. Additionally, an increased power loss is experienced during the steady state conditions by the increased voltage establishing the coil current.

SUMMARY OF THE INVENTION

An object of the present invention is to provide an improved square-wave signal generator.

Another object of the present invention is to provide an improved signal generator waveshape signal to a field coil for an electromagnetic flow meter.

In accomplishing these and other objects, there has been provided, in accordance with the present invention, a rectangular waveshape signal generator having output terminal means, a pair of voltage sources for providing two different output voltages, switching means connected between the pair of voltage sources and the output terminal means and responsive to a current being supplied by the terminal means to switch a voltage supplied to the output terminal means between the pair of voltage sources. The output terminal means includes a switch means for periodically reversing the polarity of an input voltage supplied to the output terminal means.

BRIEF DESCRIPTION OF THE DRAWINGS

A better understanding of the present invention may be had when the following detailed description is read in connection with the accompanying drawings, in which.

DETAILED DESCRIPTION OF THE PREFERRED EMBODIMENT

Figure 1:
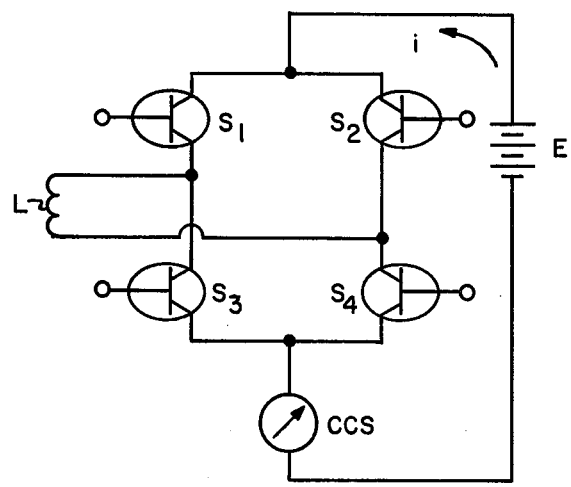
FIG. 1 is a circuit diagram showing a basic example of a prior art signal generator circuit utilizing the rectangular waveform current.

FIG. 1 shows a basic example of a prior art excitation circuit utilizing a rectangular waveform current.

In FIG. 1, $S_1$ to $S_4$ designate switches constituting a switching circuit for changing an excitation current path. Switches $S_1$ and $S_4$ are operated to establish a conductive path different from that of energized switches $S_2$ and $S_3$ whereby an alternating current derived from a direct current source E flows through an excitation coil L. Thus, when switches $S_1$ and $S_4$ are conductive, the current flow path through the coil L is in one direction while the switch $S_2$ and $S_3$ determine a current flow path in an opposite direction through the coil L. Basically, the switches $S_1$ to $S_4$ are arranged in a bridge circuit with the coil L being connected across one bridge diagonal, i.e., between the switch $S_1$, $S_3$ junction and the switch $S_2$, $S_4$ junction. The switches $S_1$ through $S_4$ may be either electromechanical switches or solid state (transistor) switches which are operated on a periodic basis by an suitable energizing source or oscillator (not shown) to effect the switching of the energizing current i through the coil L. The energizing source E is connected through a constant current source CCS across the other bridge diagonal. The source CCS in series with the switch bridge represents a variable constant current circuit which sets a steady-state value of the excitation current i from the direct current (DC) voltage source E.

Figure 2:
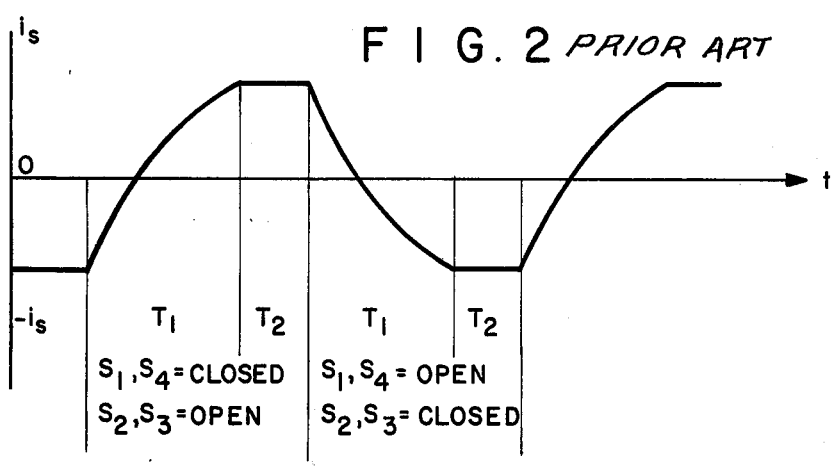
FIG. 2 is a waveform diagram of the output signal from the circuit shown in FIG. 1.

According to the signal generator circuit as constituted above and shown in FIG. 1, the rectangular waveform excitation output current i varies with time as shown in FIG. 2. As seen from FIG. 2, an actual output current i is not always in a pure rectangular waveform. Due to the effect of the coil L, the switching circuit operation for changing the excitation current (the state $S_1$, $S_4$:ON and $S_2$, $S_3$:OFF↔the state $S_1$, $S_4$:OFF and $S_2$, $S_3$:ON), the current i neither rises up sharply nor falls down abruptly, thus creating a moderate transient period $T_1$ and an intermediate steady-state period $T_2$.

Shortening this transient period $T_1$ only may be realized by increasing the output voltage of the direct current voltage source E. In this case, however, an unnecessarily large voltage is required for establishing a predetermined constant current $i_s$ thus resulting in a large power loss during the steady-state period $T_2$.

Figure 3:
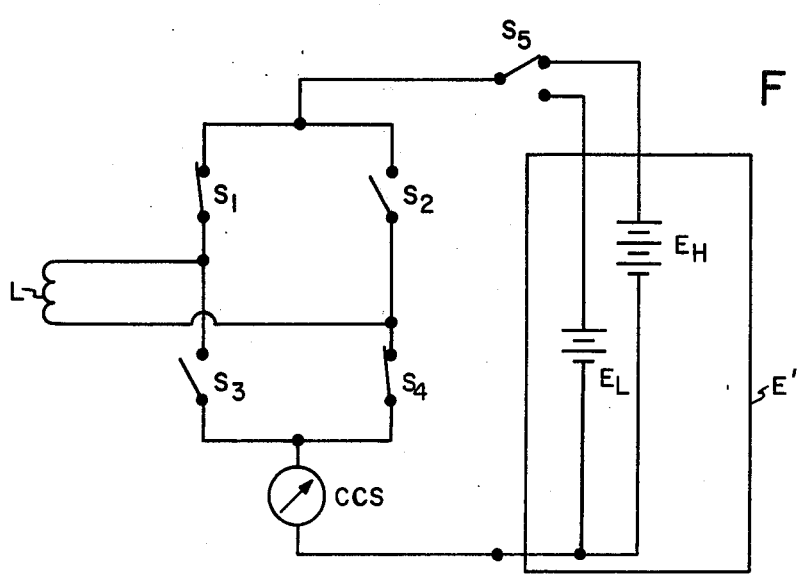
FIG. 3 is a simplified circuit diagram showing the principle of operation of the present invention.

FIG. 3 is a simplified circuit diagram for explaining the principle of this invention. In FIG. 3, like symbols as shown in FIG. 1 represent like elements. A direct current (DC) voltage source E' is provided to concurrently supply on respective outputs a higher output voltage EH as well as a lower output voltage EL. A double pole, single throw switch $S_5$ connected between the two outputs of the source E' and the switches $S_1$ to $S_4$ is used for changing the switched voltage by selecting the desired voltage for application to the switches $S_1$ to $S_4$.

Operation of the circuit as constituted in FIG. 3 is as follows: assume that the excitation current i has been changed from one steady-state value to the other steady-state value, from $-i_s$ to $+i_s$ for instance. Since the constant current circuit CCS is almost in a short circuit condition at this time, the excitation current i may be expressed approximately as $$i = \frac{E}{R}(1 - \epsilon - \frac{R}{L}t) - i_s \epsilon - \frac{R}{L}t$$

where
  R: series resistance of the circuit
  L: inductance of the excitation coil Accordingly, the larger the voltage E is, the shorter the time required for the excitation current reaching the steady-state value $+i_s$ becomes.

However, as the voltage across the terminals of the coil L is small during the period $T_2$, it is not necessary to continuously provide an excessively large voltage E. Accordingly, a high voltage E is only used momentarily to obtain the steady-state value $i_s$.

Specifically, the selection switch $S_5$ is operated to select the higher voltage EH during the transient period $T_1$ and the lower voltage EL during the steady-state period $T_2$.

As a consequence, shortening of the transient period $T_1$ is effected as well as the control of power loss during the steady-state period $T_2$.

Figure 4:
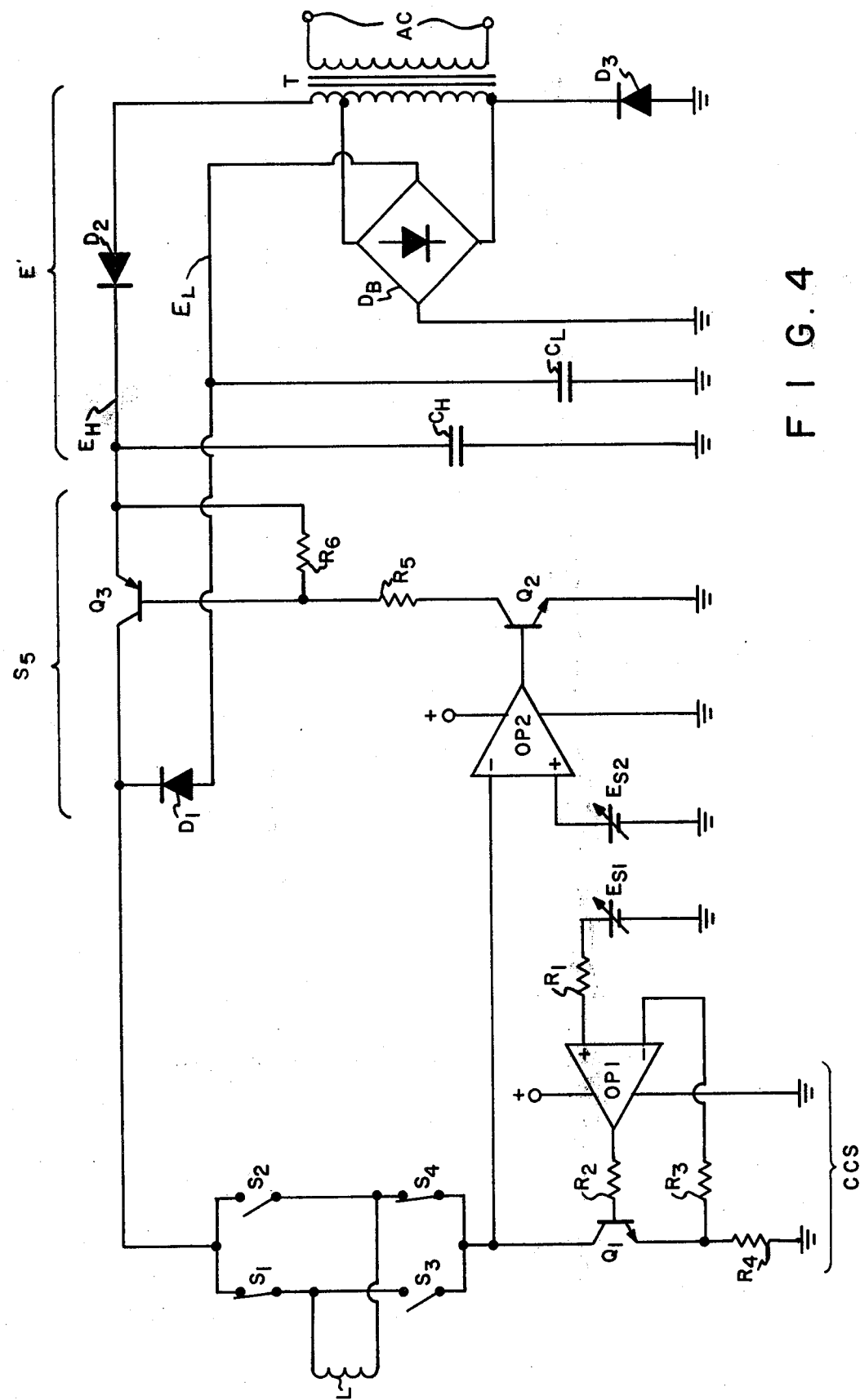
FIG. 4 illustrates an example of a detailed circuit embodying the present invention.

FIG. 4 shows a detailed example of a signal generator circuit embodying this invention. In FIG. 4, like symbols as used in FIGS. 1 and 3 represent like parts. The constant current circuit CCS comprises a first differential amplifier OP1, resistors $R_1$ through $R_4$, a transistor $Q_1$ and a setting voltage source $E_{S1}$. Specifically, the setting source $E_{S1}$ is arranged to apply a predetermined voltage to the non-inverting input of the first amplifier OP1. The output of the amplifier OP1 is connected through a resistor $R_2$ to the base of the transistor $Q_1$ which has its emitter connected to the inverting input of the first amplifier OP1 and to ground through the resistor $R_4$. The collector of the transistor $Q_1$ is connected to the switch bridge $S_1$ to $S_4$ and to the inverting input of a second differential amplifier OP2. The second amplifier OP2 is used as a comparator for comparing the output terminal voltage of the constant current circuit CCS on the collector of the transistor $Q_1$ with a reference voltage $E_{S2}$ applied to the non-inverting input of the second amplifier OP2. The output of the second amplifier OP2 is applied to the base of a second transistor $Q_2$ which is controlled to be ON or OFF by means of the output signal of said comparator OP2.

The emitter-collector path of the second transistor $Q_2$ is connected through a resistor $R_5$ to the base of a series transistor $Q_3$ used as the switch $S_5$. A resistor $R_6$ connects the base of the transistor $Q_3$ to its emitter. The collector of the transistor $Q_3$ is connected to the switch bridge $S_1$ to $S_4$ and through a diode $D_1$ to the output of a full-wave rectifying bridge $D_B$. The bridge $D_B$ is connected to be energized by the secondary winding of a power transformer T having its primary winding connected to an alternating current source (AC). Actually, the bridge $D_B$ is connected to a tapped portion of the secondary winding of the transformer T. The output of the bridge $D_B$ is filtered by a filter capacitor $C_L$ to supply the lower output voltage $E_L$.

The full secondary winding of the transformer T is connected through a diode $D_2$ to the emitter of the series transistor $Q_3$ as a source for obtaining a half-wave rectified higher output voltage $E_H$. A filter capacitor $C_H$ is connected to the emitter of the $Q_3$ transistor to filter the higher voltage $E_H$. A return path diode $D_3$ is connected in the return path of the higher voltage supply $E_H$ to the transformer T and is poled similarly to the rectifying diode $D_2$.

The circuit as constituted in FIG. 4 is operated as follows:

Initially, the steady-state value of the excitation current i is set at a desired point by means of the setting voltage $E_{S1}$ of the constant current circuit CCS.

When the conductive state of the switches $S_1$ through $S_4$ are reversed for changing the excitation current i flow in the excitation coil L, the collector voltage of the output transistor $Q_1$ in the constant current circuit CCS becomes lower than the reference voltage $E_{S2}$. In response to this state, the comparator OP2 turns on the transistor $Q_2$. When the transistor $Q_2$ is turned on, a current flow through the transistor $Q_2$ and resistors $R_5$ and $R_6$ turns on the switching transistor $Q_3$. The diode $D_1$ is now biased reversely with the high output voltage $E_H$ value at its cathode whereby the circuit selects the higher output voltage value $E_H$ from the DC voltage source E' for application to the switch bridge $S_1$ to $S_4$.

When the excitation current i reaches another steady-state value, the collector voltage of the output transistor $Q_1$ of the circuit CCS becomes higher than the reference voltage $E_{S2}$, whereby the transistor $Q_2$ is turned off by the comparator OP2. When the transistor $Q_2$ is turned off, the transistor $Q_3$ is also turned off, whereby the higher output voltage value $E_H$ is removed from the cathode of the diode $D_1$. Consequently, the diode $D_1$ becomes conductive to enable the circuit to select the lower output voltage value $E_L$ from the DC voltage source E'.

The operation set forth above is performed at every time of changing of the bridge switches $S_1$ through $S_4$, and the higher voltage value $E_H$ is selected during the transient period $T_1$ while the lower voltage $E_L$ is selected during the steady-state period $T_2$.

It should be noted that other methods for switching the voltages between the transient period and the steady-state may be considered by one skilled in the art. For instance, it is possible to use a monostable multivibrator which is triggered when the switch brige changeover circuit $S_1$ to $S_4$ is operated for obtaining the lower output voltage value $E_L$ after a constant time (known transient period period + time $\alpha$) has passed from the time of the changeover of the circuit for changing the excitation current i through the coil L.

According to this invention, the changeover is made when the output terminal voltage of the constant current circuit CCS is detected. Therefore, the changeover is made when the excitation current i reaches the steady-state value. Further, in this invention, the transistor switching element is used as selective changeover means for selecting the higher output voltage while the diode is used for selecting the lower output voltage. This is effective not only for simplifying the circuit constitution but also for realizing smooth changeover, thus the possibility of having an intermediate operating state without a power supply is avoided.

The explanation hereunto has been made taking the rectangular waveform current having dual polarity. However, it is apparent that the invention can be applied to the case of the single polarity rectangular waveform current without losing the same advantage and effect.

As discussed above, according to this invention, the transient period of the rectangular waveform signal can be shortened by means of excitation with a higher output voltage only during the transient period. Thus, the power loss can be minimized since the excitation is changed to the lower voltage mode during the steady-state period.

Accordingly, it may be seen that there has been provided, in accordance with the present invention, an improved square-wave signal generator particularly suited for supplying an energizing signal to a field coil of an electromagnetic flowmeter.

The embodiments of the invention in which an exclusive property or privilege is claimed are defined as follows:

1. A signal generator circuit comprising
a first source of a first voltage signal,
a second source of a second voltage signal, output terminal means for connection to a signal load, switching means having a first input connected to said first source, a second input connected to said second source, and an output connected to said terminal means, said switching means being responsive to an energizing signal to selectively connect said output to said first input in a first switching mode and to said second input in a second switching mode, and switch control means responsive to a driving voltage for a current being supplied to the signal load from said terminal means to generate said energizing signal to operate said switching means between said first and second switching modes, wherein said switching means includes a transistor having its emitter-collector path connected between said second source and said terminal means and its base arranged to be energized by said switch control means and a diode means connected between said first source and said terminals means and poled to be back-biased by an output signal from said transistor-emitter collector path.

2. A signal generator circuit as set forth in claim 1 wherein said first and second voltage signals are direct current signals and said first voltage signal has a lower magnitude than said second voltage signal.

3. A signal generator as set forth in claim 2 wherein said terminal means includes a pair of output terminals arranged to be connected to the signal load and a periodically operated switch means connected to periodically reverse the polarity of an input signal applied to said terminal means before application to said output terminals to alternately produce a transient and steady state condition of the current being supplied to the signal load.

4. A signal generator as set forth in claim 3 wherein said terminal means further includes a constant current source connected between said switching means and said switch means and responsive to said first and second voltage signals to generate the current for application to said signal load, said current having a transient state and a steady state with said switch control means operating said switching means to said first switching mode during the steady state of said current and to said second switching mode during the transient state of said current.

5. In an excitation circuit for use in an electromagnetic flow meter of the class wherein a rectangular waveform electric current is utilized for field coil excitation and said circuit comprises a series connection of a DC voltage source, a switching circuit for reversing the polarity of a DC voltage supplied to the field coil by the DC voltage source and a constant current circuit, characterized in that the DC voltage source is able to provide two different output voltages, and including a switch means for selecting one of the two different output voltages in a first mode of operation and the other of the two different output voltages in a second mode of operation and switch control means responsive to a driving voltage for a current being supplied to the field coil to operate said switching means between said first and second modes of operation so that a higher output voltage is selected during a transient period of excitation current following changeover operation of said switching circuit while the lower output voltage is selected during the steady-state excitation current operation.

6. An excitation circuit according to claim 5 wherein said switch control means includes a reference voltage source, and control signal producing means for producing a control signal to operate said switching means in response to a comparision between a terminal voltage of source constant current circuit and a reference voltage from said source.

7. An excitation circuit according to claim 6, wherein the higher output voltage of said DC voltage source is supplied through a switch in said switching means which is controlled to open and close by means of said control signal obtained from said control signal producing means while the lower output voltage is supplied through a diode back-biased by an output from said switch.

* * * * *